(12) United States Patent
Ferguson, IV

(10) Patent No.: US 10,192,177 B2
(45) Date of Patent: Jan. 29, 2019

(54) AUTOMATED ASSIGNMENT OF ERRORS IN DEPLOYED CODE

(71) Applicant: Microsoft Technology Licensing, LLC, Redmond, WA (US)

(72) Inventor: Harry Phillip Ferguson, IV, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 210 days.

(21) Appl. No.: 15/197,404

(22) Filed: Jun. 29, 2016

(65) Prior Publication Data

US 2018/0005153 A1    Jan. 4, 2018

(51) Int. Cl.
| | |
|---|---|
| *G06F 9/44* | (2018.01) |
| *G06Q 10/06* | (2012.01) |
| *G06F 11/36* | (2006.01) |
| *G06F 11/32* | (2006.01) |

(52) U.S. Cl.
CPC ........ *G06Q 10/06311* (2013.01); *G06F 11/32* (2013.01); *G06F 11/362* (2013.01)

(58) Field of Classification Search
CPC .............. G06Q 10/06; G06Q 10/06311; H04L 9/3247; H04L 63/1425; G06F 17/2264; G06F 17/3038; G06F 17/30879; G06F 11/0748; G06F 11/32; G06F 8/54; G06F 8/71; G06F 21/51
See application file for complete search history.

(56) References Cited

U.S. PATENT DOCUMENTS

| | | | |
|---|---|---|---|
| 5,778,231 A | * | 7/1998 | van Hoff .................. G06F 8/54 717/143 |
| 7,191,364 B2 | | 3/2007 | Hudson et al. |
| 7,614,043 B2 | | 11/2009 | Ognev et al. |
| 8,140,514 B2 | | 3/2012 | Nguyen et al. |
| 8,615,741 B2 | | 12/2013 | Hudson |
| 8,978,016 B2 | | 3/2015 | Gataullin et al. |
| 9,009,665 B2 | | 4/2015 | Supplisson et al. |
| 9,201,646 B2 | | 12/2015 | Balachandran |
| 9,626,283 B1 | * | 4/2017 | Zlatnik .................. G06Q 10/06 |

(Continued)

OTHER PUBLICATIONS

Shokripour, et al., "Automatic Bug Assignment Using Information Extraction Methods", In Proceedings of International Conference on Advanced Computer Science Applications and Technologies, Nov. 26, 2012, pp. 144-149.

(Continued)

*Primary Examiner* — Tuan A Vu
(74) *Attorney, Agent, or Firm* — International IP Law Group, PLLC

(57) ABSTRACT

An example system for debugging transformed code includes a computer processor and computer memory including instructions that cause the computer processor to receive an error corresponding to a transformed code from a production service. The instructions also cause the processor to correlate the error to a symbol generated for the transformed code. The instructions further cause the processor to query a repository storing a source code corresponding to the transformed code using the symbol. The instructions also further cause the processor to assign the error to a developer based on a version history of the source code in the repository.

17 Claims, 8 Drawing Sheets

(56) References Cited

U.S. PATENT DOCUMENTS

| | | |
|---|---|---|
| 2005/0138536 A1 | 6/2005 | Smith et al. |
| 2007/0073677 A1* | 3/2007 | Lamouline ........ G06F 17/30879 |
| 2009/0070734 A1* | 3/2009 | Dixon ...................... G06F 8/71 |
| | | 717/102 |
| 2013/0339742 A1* | 12/2013 | Ignatchenko ......... H04L 9/3247 |
| | | 713/176 |
| 2014/0109053 A1 | 4/2014 | Vasudevan et al. |
| 2014/0149435 A1 | 5/2014 | Sisman et al. |
| 2014/0181592 A1 | 6/2014 | Andrew et al. |
| 2014/0365828 A1 | 12/2014 | Jiang et al. |
| 2015/0019564 A1 | 1/2015 | Higginson et al. |
| 2015/0033202 A1 | 1/2015 | Wilson et al. |
| 2016/0048513 A1* | 2/2016 | Barroso .............. G06F 17/3038 |
| | | 707/691 |
| 2016/0241579 A1* | 8/2016 | Roosenraad ........ H04L 63/1425 |
| 2017/0102988 A1* | 4/2017 | Purushothaman .. G06F 11/0748 |
| 2017/0337184 A1* | 11/2017 | Quah .................. G06F 17/2264 |
| 2017/0357809 A1* | 12/2017 | Smith .................... G06F 21/51 |

OTHER PUBLICATIONS

Linares-Vásquez, et al., "Triaging Incoming Change Requests: Bug or Commit History, or Code Authorship?", In Proceedings of 28th IEEE International Conference on Software Maintenance, Sep. 23, 2012, pp. 451-460.

* cited by examiner

100

BUG 178086
178086 JSError - my-cool-repo/src/foo/control.ts:10 - TypeError: Cannot read property 'register' of unde
New    ▼ John Smith    🚩 58

Repro Steps
B *I* U + X ≡≡ ≡≡ ⫶⫶ ≡

Summary
Last Reproed on 4/15/2016, 11:31:33 PM PST - 4/16/2016 2:31:33 PM UTC
Errors: 92,890
Users Affected: 614
Manifests Affected: 2
src/foo/control.ts:10
Found in my-cool-repo - v3.1.10

Top 5 Committers

| Committer | Total Commits |
|---|---|
| John Doe - john.doe@emailservice1.com | 1 |
| Jane Smith - jane.smith@emailservice1.com | |

Build Numbers by Total Errors

| Build Numbers | Total Errors |
|---|---|
| release_build_2016-06-06.0001 | 77,493 |
| release_build_2016-06-06.0002 | 13,588 |
| release_build_2016-06-06.0003 | 1,809 |

1 of 111 ← ↑ ☐
🔲 ↻    Follow

402 — (main view)
404 — Top 5 Committers section
406 — Total Commits column
408 — Build Numbers section
410 — Total Errors column

400
FIG. 4

BUG 178086
178086 JSError - /my-cool-repo/src/foo/control.ts:10-TypeError: Cannot read property 'register' of unde ~402      1 of 111
New          John Smith ▼    ✱58

Repro Steps
B I U + X ≡ ≡ ≡ ⊞

Top 10 Browser by Total Errors

| Browser Name | Total Errors |
|---|---|
| Browser 1 | 76,137 |
| Browser 2 | 6,623 |
| Browser 3 | 2,547 |
| Browser 4 | 2,083 |
| Browser 5 | 1,255 |
| Browser 6 | 1,067 |
| Browser 7 | 532 |
| Browser 8 | 473 |
| Browser 9 | 317 |
| Browser 10 | 269 |

~504

502

Top 10 Markets by Total Errors ~508

Top 10 Markets by Total Errors

| Market | Total Errors |
|---|---|
| en-US | 40,331 |
| pt-BR | 10,054 |
| es-MX | 8,635 |
| en-GB | 7,084 |
| ru-RU | 3,900 |
| nl-NL | 2,690 |
| es-419 | 2,601 |
| ja-JP | 2,060 |
| en-CA | 1,726 |
| es-ES | 1,661 |

Top 10 Browser by Total Errors

BUG 178086
178086 JSError - /my-cool-repo/src/foo/control.ts:10-TypeError: Cannot read property 'register' of unde
New    John Smith                                                                       1 of 111
Repro Steps
B / U + X ≡ ≡ ≡ ≣ ≣

| Information | Un-Minified Stack | Raw Stack |
|---|---|---|
| release_build_ 2016-06-06.001 | 1. /my-cool-repo/src/foo/control.ts:XX:XX at Function.e.reisterComponent (https://somedrive .net/files/release_build_2016-60-06.0001/cooldrive app-b94dc68.js:X:XXXXX) | Cannot Read Property 'register' of undefined TypeError: Cannot read property 'register' of undefined at Function.e.registerComponent (https:// somedrive.net/files/release_build_2016-06-06.0001/ cooldriveapp-b94dcb68.js:X:XXXXX) at Object.< anonymous> (https://somedrive.net/files/ |
| Errors: 552 | | release_build_2016-06-06.001.js:X:XX) at Object.w.execCb (https://cooldrive.web/:XX:XXXXX) |
| en-US | 2. /my-cool-repo/src/local/controls/shim/ autoRedeem/AutoRedeem.ts:X:XX at Object.<anonymous> (https://somedrive .net/files/release_build_2016-06-06.0001.js:X:XX) | at Object.y.check (https://cooldrive.web/:XX:XXXX) at Array.<anonymous> (https://cooldrive.web/: XX:XXXX) at Object.y._emit (https://cooldrive.web/: XX:XXXX) at h (https://cooldrive.web/:XX:XXXX) at Object.y.emit (https://cooldrive.web/:XX:XXXX) at |
| SessionId: XXXXXXXX-XXXX- XXXX-XXXX-XXXXXXXXX | | Object.y.check (https://cooldrive.web/:XX:XXXX) at Object.y._enable (https://cooldrive.web/:XX:XXXXX) |

AUTOMATED ASSIGNMENT OF ERRORS IN DEPLOYED CODE

BACKGROUND

Software development may include a debugging process wherein a number of bugs, or errors in the software, are identified and assigned to developers for correction. In some examples, software development can include any number of teams of developers. Accordingly, assigning the error can require several developers or teams of developers to review the error and determine a single developer or team of developers to correct the error.

SUMMARY

The following presents a simplified summary of the innovation in order to provide a basic understanding of some aspects described herein. This summary is not an extensive overview of the disclosed subject matter. It is intended to neither identify key elements of the disclosed subject matter nor delineate the scope of the disclosed subject matter. Its sole purpose is to present some concepts of the disclosed subject matter in a simplified form as a prelude to the more detailed description that is presented later.

One implementation provides for a system for debugging transformed code. The system includes a computer processor and a computer-readable memory storage device storing executable instructions that can be executed by the processor to cause the processor to receive an error corresponding to a transformed code from a production service. The executable instructions can be executed by the processor to correlate the error to a symbol generated for the transformed code. The executable instructions can be executed by the processor to query a repository storing a source code corresponding to the transformed code using the symbol. The executable instructions can be executed by the processor to assign the error to a developer based on a version history of the source code in the repository.

Another implementation provides a method for debugging transformed code. The method includes receiving an error corresponding to the transformed code. The method also includes correlating the error to a symbol generated for the transformed code. The method additionally includes querying a repository storing a source code corresponding to the transformed code using the symbol, wherein the symbol includes metadata including a location of the repository. The method further also includes assigning the error to a developer based on a version history of the source code in the repository.

Another implementation provides for one or more computer-readable memory storage devices for storing computer readable instructions that, when executed by one or more processing devices, instruct the debugging of software. The computer-readable instructions may include code to receive errors corresponding to a transformed code from a production service. The computer-readable instructions may also include code to. The computer-readable instructions include code to correlate the errors to a symbol generated during a build of the transformed code, wherein the symbol includes metadata including transformation data. The computer-readable instructions may also include code to reverse the transformed code to a source code based on transformation data in the metadata and locate the errors in the source code. The computer-readable instructions may include code to aggregate the errors to identify a set of unduplicated errors that excludes duplicate errors based on the source code. The computer-readable instructions may include code to assign each of the unduplicated errors to a developer based on a version history of the source code in a repository storing the source code.

The following description and the annexed drawings set forth in detail certain illustrative aspects of the disclosed subject matter. These aspects are indicative, however, of a few of the various ways in which the principles of the innovation may be employed and the disclosed subject matter is intended to include all such aspects and their equivalents. Other advantages and novel features of the disclosed subject matter will become apparent from the following detailed description of the innovation when considered in conjunction with the drawings.

BRIEF DESCRIPTION OF THE DRAWINGS

FIG. 4 is an example error report including top committers;

FIG. 5 is an example error report including a list of affected browsers;

FIG. 6 is an example report including an unminified stack;

DETAILED DESCRIPTION

Figure 1:
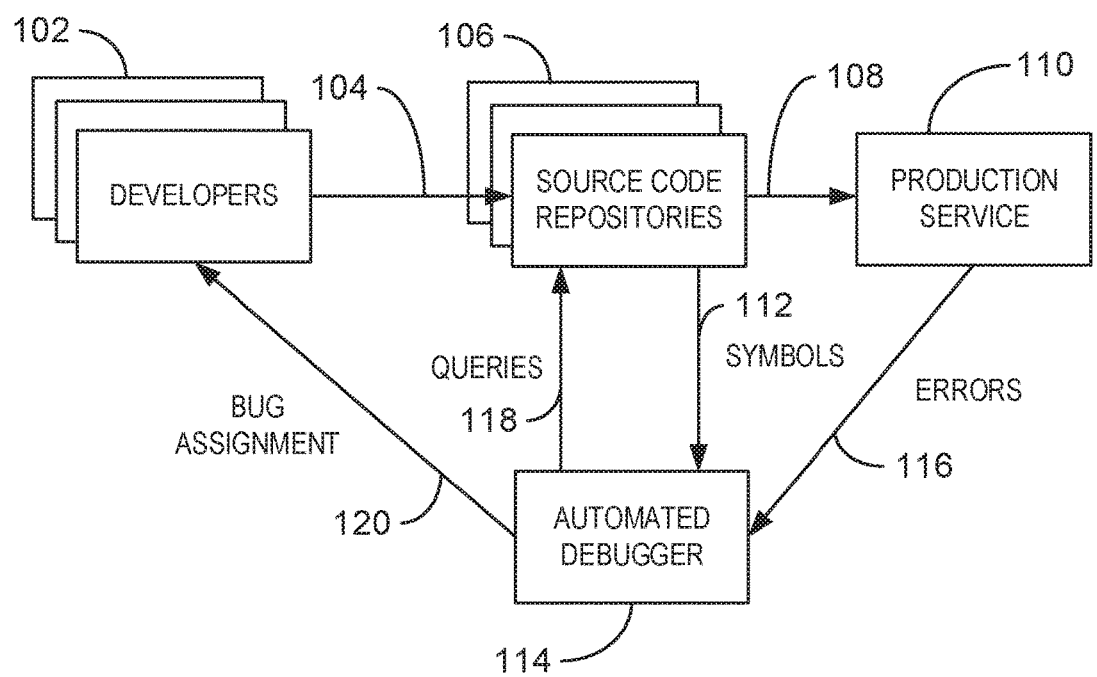
FIG. 1 is a block diagram of an example system for assigning errors.

Previously, understanding the cause of a software error was a manual process that was very time consuming. A software error, also referred to as a bug, may include an error, flaw, failure or fault in a computer program that causes the computer program to produce an incorrect or unexpected result, or to behave in unintended ways. In some examples, detecting the cause for an error can involve a manual investigation of the developers and/or teams of developers that may have caused the error. In some examples, detecting the cause of an error involved also includes reversing the state of a stack, which is very time consuming and can only be performed in a probabilistic manner.

Currently, a number of transformations may be applied to source code before the source code is shared or deployed. In some examples, executing transformed or deployed code can result in stack traces that include errors that may be all caused by the same line of source code. Depending on transformations applied, the stack traces may also return errors in different locations. Therefore, it may be difficult if not impossible to make sense of stack traces returned by services using deployed code.

Embodiments of the present techniques described herein provide a system, method, and computer-readable medium with instructions for assignment of errors detected in production code. In some examples, a processor may receive an error corresponding to transformed code from a production service. For example, the transformed code may be source code that has had one or more transformations applied. The processor can correlate the error to a symbol generated for the transformed code. For example, the system may generated the symbol during the transformation of the source code into the transformed code. The processor may then query a repository associated with the source code using the symbol. For example, the symbol may include metadata including a location of a repository associated with the source code. The processor may then automatically assign the error to a developer based on a version history of the source code in the associated repository. A version history can include a list of version names or version numbers used to keep track of incrementally different versions of source code and one or more developers associated with each version name or version number. In some examples, the error may be assigned based on a number of times a source code was edited by a developer, or based on the last developer to edit the source code, among other factors. In some examples, a number of errors may also be triaged or assigned a level of urgency based on total instances of each error. Advantageously, the present techniques may be used to deliver actionable errors to developers as fast as possible with less cost and time. Moreover, the present techniques may remove bottlenecks in the process related to understanding the cause of the error, basic investigations of the error, and assignment of the error. The present techniques thus improve the processes of software development generally and software debugging more specifically.

Figure 7:
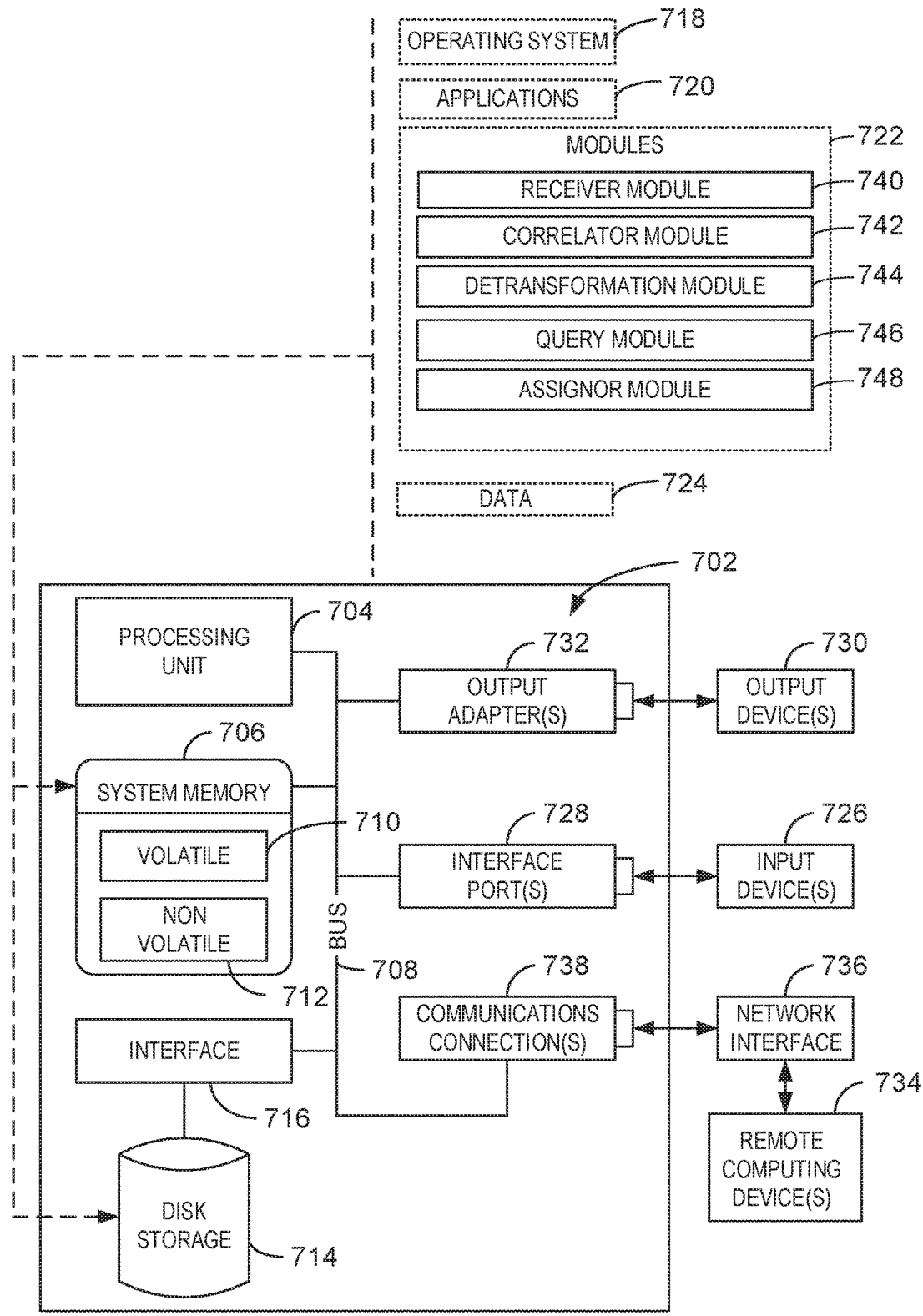
FIG. 7 is a block diagram of an example operating environment configured for implementing various aspects of the techniques described herein.

As a preliminary matter, some of the figures describe concepts in the context of one or more structural components, variously referred to as functionality, modules, features, elements, or the like. The various components shown in the figures can be implemented in any manner, such as software, hardware, firmware, or combinations thereof. In some cases, various components shown in the figures may reflect the use of corresponding components in an actual implementation. In other cases, any single component illustrated in the figures may be implemented by a number of actual components. The depiction of any two or more separate components in the figures may reflect different functions performed by a single actual component. FIG. 7, discussed below, provides details regarding one system that may be used to implement the functions shown in the figures.

Other figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into multiple component blocks, and certain blocks can be performed in an order that differs from that which is illustrated herein, including a parallel manner of performing the blocks. The blocks shown in the flowcharts can be implemented by software, hardware, firmware, manual processing, or the like. As used herein, hardware may include computer systems, discrete logic components, such as application specific integrated circuits (ASICs), or the like.

As to terminology, the phrase "configured to" encompasses any way that any kind of functionality can be constructed to perform an identified operation. The functionality can be configured to perform an operation using, for instance, software, hardware, firmware, or the like. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the disclosed subject matter may be implemented as a method, apparatus, or article of manufacture using standard programming and engineering techniques to produce software, firmware, hardware, or any combination thereof to control a computing device to implement the disclosed subject matter. The term "article of manufacture," as used herein is intended to encompass a computer program accessible from any computer-readable storage device or media. Computer-readable storage media include magnetic storage devices, e.g., hard disk, floppy disk, magnetic strips, optical disk, compact disk (CD), digital versatile disk (DVD), smart cards, flash memory devices, among others. Moreover, computer-readable storage media does not include communication media such as transmission media for wireless signals. In contrast, computer-readable media, i.e., not storage media, may include communication media such as transmission media for wireless signals.

FIG. 1 is a block diagram of an example system 100 for assigning errors. The system 100 includes one or more developers 102 that provide one or more modifications 104 to source code that may be stored on one or more repositories 106. The modifications 104 can include any suitable change to one or more lines of source code such as adding new lines of source code, removing lines of source code, changing variable names, changing values assigned to variables, and the like. In some embodiments, the source code in repositories 106 may be transformed 108 and deployed to a production service 110. A number of symbols 112 may be generated and sent to an automated debugger 114. For example, the symbols 112 may include metadata such as the repository storing source code that is associated with a particular transformed code. In some examples, the symbols 112 may be generated when the source code is transformed 108. The production service 110 may execute the transformed code and generate one or more errors 116. For example, the errors may be included in stack traces. The errors 116 may be sent to the automated debugger 114. In some examples, the automated debugger may send one or more queries 118 to the source code repositories 106 to retrieve source code associated with transformed code that produced an error 116. For example, the query may be sent to a particular repository using the metadata from an associated symbol 112. In some examples, the automated debugger may aggregate errors to remove duplicate errors associated with the same error and triage errors based upon the total amount of instances of each error. The automated debugger 114 may then assign 120 errors to one or more developer 102 based on a version history of the source code in the associated repository. For example, an error may be assigned to a particular developer based on the number of edits that the particular developer made to source code associated with the error. In some examples, an error may be assigned to a particular developer based on the last edit to the source code being made by that developer.

Examples of the system 100 can take several different forms depending on the location of the production service, the location of the transformation, etc. In some examples, multiple automated debuggers may operate in parallel.

Figure 2:
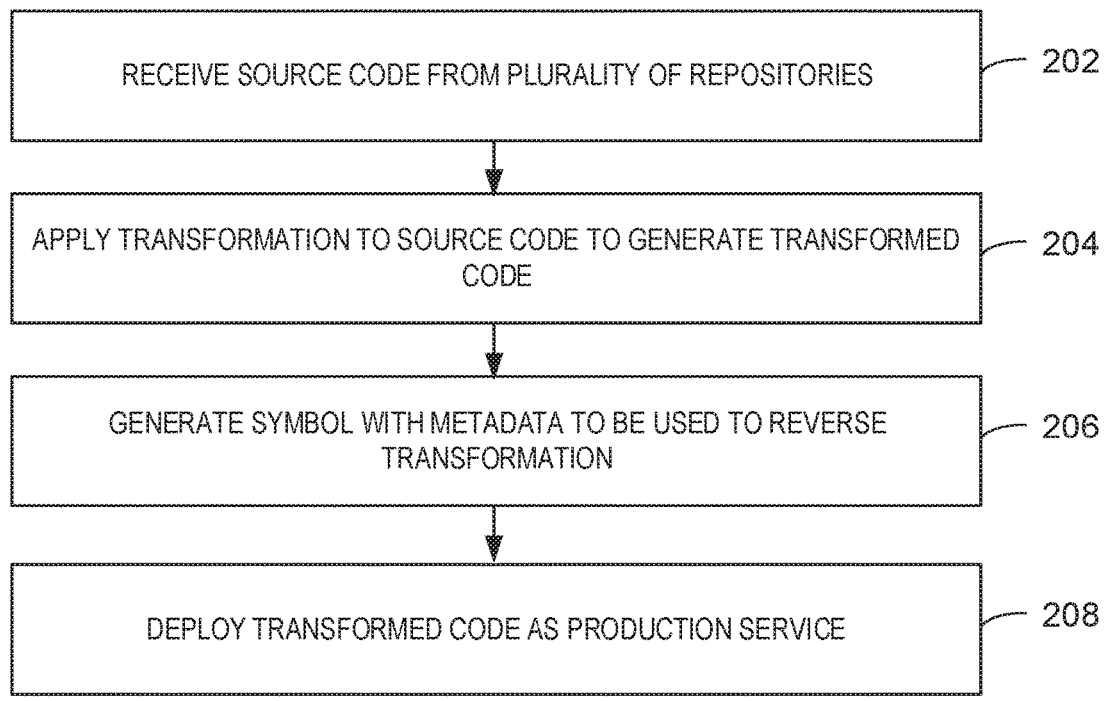
FIG. 2 is a process flow diagram of an example method for transforming code.

FIG. 2 is a process flow diagram of an example method for transforming code. One or more components of hardware or software of the operating environment 100, may be configured to perform the method 200. In some examples, various aspects of the method may be performed in a cloud computing system. The method 200 may begin at block 202.

At block 202, a processor receives source code from a plurality of repositories. For example, the source code may correspond to one or more portions of a software project.

At block 204, the processor applies a transformation to the source code to generate transformed code. For example, the transformation may include minification, concatenation, combination, or any other suitable translations from source code to more performance optimal formats. In some examples, the transformed code may be deployed to a production service for generating or building a software project that includes the transformed code.

At block 206, the processor generates a symbol to be used to reverse the transformation. For example, the symbol may be a source map, a program database (PDB), or any other suitable symbol. A PDB file may hold debugging and project state information that allows incremental linking of a debug configuration of a program. A source map may include the type of transformation and a mapping between source code and transformed code. In some examples, the generated symbol may include metadata indicating a repository onto which transformed code and its associated source code is stored. In some examples, the source maps may have been initially generated when the source code was compiled for the first build.

In some examples, the metadata in the source maps may be updated during a build to describe which repository source code files came from. For example, the metadata may include a location for the repository that stores the source code that was transformed and any child dependent repositories. In some examples, source code can be bundled and minified during a release build. During the release build process, new sourcemaps can be generated that can be used to reverse bundling and minification, and point back to the original source code. In some examples, the repository metadata can also be preserved to indicate the original repository. In some examples, for release builds, the new source maps can be stored in a queryable location. For example, each source map can be stored along with any number of attributes or pieces of information such as the source map name, the file name the source map represents (the bundled file name), and a unique build number. The processor can execute queries using the attributes or pieces of information associated with each source map to determine the original source code file corresponding to transformed source code.

At block 208, the processor deploys the transformed code as a production service. In some examples, the transformed code may produce an error during the execution of the software package used by the production service that includes the transformed code. For example, the error may be returned in a stack trace that includes the line number of code causing the error.

This process flow diagram is not intended to indicate that the blocks of the method 200 are to be executed in any particular order, or that all of the blocks are to be included in every case. Further, any number of additional blocks not shown may be included within the method 200, depending on the details of the specific implementation.

Figure 3:
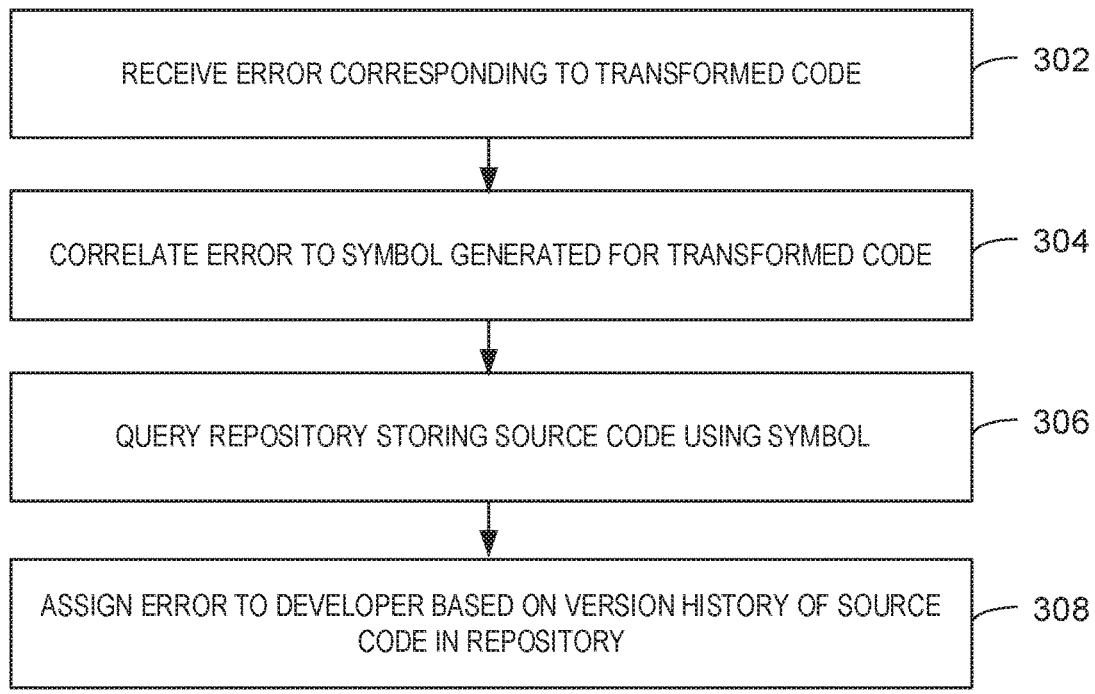
FIG. 3 is a process flow diagram of an example method for debugging transformed code.

FIG. 3 is a process flow diagram of an example method for debugging transformed code. One or more components of hardware or software of the operating environment 100, may be configured to perform the method 300. In some examples, various aspects of the method may be performed in a cloud computing system. The method 300 may begin at block 302.

At block 302, a processor receives an error corresponding to transformed code. For example, the error may include a stack trace from a production service using the transformed code. The stack trace may indicate one or more lines of code associated with the error. In some examples, the processor may collect stack traces using any suitable form of telemetry. Telemetry refers to any automated communications process by which measurements and other data are collected at remote or inaccessible points and transmitted to receiving equipment for monitoring. For example, a telemeter may be installed at a production service and remotely collect errors and associated information at the production service. In some examples, the stack traces may be normalized. For example, since browsers may have different formats for logging stack traces, normalization may allow stack traces from different browsers to be analyzed and aggregated. In some examples, all errors may be stamped with the version of a web browser returning the error and metadata so that the raw stacks corresponding to the errors can be normalized and reverted later on. For example, normalization may remove particular formatting styles associated with particular browsers. In some examples, the version stamp may be used to revert files back into the original format used by the particular browser and particular version of the browser.

At block 304, the processor correlates the error to a symbol generated for the transformed code. For example, the symbol may have been generated during a transformation of source code into the transformed code as discussed above. In some examples, the symbol may include metadata such as a repository storing the source code associated with the transformed code.

In some examples, after the stack trace is normalized, the processor may join a first line of the stack trace with the metadata uploaded for each build in the symbol. In some examples, the processor may perform a join on the filename logged in the stack trace and the build that included the file corresponding to the filename with the source map that matches the file name and the associated build. Once the data is joined, the processor may reverse the bundling and minification process using a source map. For example, the reverse transformation may generate a line number on the original source code file in the original repository. In some examples, the processor may aggregate all of the errors using the filename and line number of the original source code file. The processor may generate an error report from the aggregated errors including information such as how many times each error occurred, how many users were effected, what builds does the error producing code reside in, in what browsers does the error reproduce, what counties are effected, and what pages the error reproduces on, among other possible information. For example, the error report may include environmental information such as the runtime or browser, languages impacted, counts of users impacted, code environments/services affected by the error, and the count of sessions affected. Some example error reports are described with some of this information in the examples of FIGS. 4-6 below. In some examples, the processor may uncrunch every line in the stack trace of a predetermined number of the stack traces to provide more detailed information to a developer. Uncrunching refers to decompressing the stack trace into a pre-compressed state.

At block 306, the processor queries the repository storing the source code using the symbol. For example, the processor may locate the associated repository using an address of the repository stored in a metadata of the symbol. In some examples, a version history of the source code may be queried.

At block 308, the processor assigns the error to a developer based on a version history of the source code in the repository. In some examples, the processor may assign the error to the developer associated with the last edit or commit in the version history of the source code. In some examples, the processor may assign the error to the developer that has made more edits to the source code than other developers. For example, the processor may determine the developer is a lead developer based on a higher number of modifications to a source code associated with the error and assigning the error to the lead developer. In some examples, the processor can take the file and look up the commit history using the original path, and assign the error to the committer who edited the file the most. In some examples, the processor may automatically prioritize the errors based on how many times the errors are reproduced. For example, the processor may triage an error with other detected errors in the transformed code based on a number of times each error is reproduced. The processor may then provide a list of sorted errors to the developer for further action. In some examples, the processor may generate links to the original source line and repository so that the developer does not need to synchronize any code to see the line where the errors are being reproduced.

This process flow diagram is not intended to indicate that the blocks of the method 300 are to be executed in any particular order, or that all of the blocks are to be included in every case. Further, any number of additional blocks not shown may be included within the method 300, depending on the details of the specific implementation.

FIG. 4 is an example error report including top committers. The example error report is generally referenced by the reference number 400 and can be generated by the assignor module 748 of the computing device 700 below.

In the example of FIG. 4, the error report 400 for a particular error 402 includes a list of top committers 404 sorted by total commits 406 and a list of builds 408 sorted by total errors 410.

The example error report 400 includes a list of top committers 404 associated with source code that generated the error 402. A committer, as used herein, refers to an individual who performs a commit to the source code of a particular piece of software. A commit adds the latest changes to the source code to the repository, making these changes part of the head revision of the repository. In some examples, a list of top committers 404 associated with the error 402 can be included in the error report 400 to provide a developer assigned with debugging a detected error contact information for other developers that may be able to help debug. In some examples, the developer assigned with fixing the error 402 may be the committer 404 with higher total commits 406. For example, the developer assigned to fix the error may appear at the top of the list of committers. In some examples, the developer may be the last person to perform a commit. Thus, the developer may not necessarily appear at the top of the list of committers.

The diagram of FIG. 4 is not intended to indicate that the example operating error report 400 is to include all of the components shown in FIG. 4. Rather, the example operating error report 400 can include fewer or additional components not illustrated in FIG. 4 (e.g., additional committers, environments, etc.).

FIG. 5 is an example error report including a list of affected browsers. The example error report is generally referenced by the reference number 500 and can be generated by the assignor module 748 of the computing device 700 below.

The error report 500 for an error 402 includes a list of browsers 502 sorted by total instances 504 of error 402 and a list of countries 506 affected by error 402 sorted by total instances 508 of the error 402. In some examples, the list of countries 506 may be provided in the error report 500 to provide a developer a better scope of the error 402.

The diagram of FIG. 5 is not intended to indicate that the example operating error report 500 is to include all of the components shown in FIG. 5. Rather, the example operating error report 500 can include fewer or additional components not illustrated in FIG. 5 (e.g., additional browsers, countries, etc.).

FIG. 6 is an example report including an unminified stack. The example error report is generally referenced by the reference number 600 and can be generated by the assignor module 748 of the computing device 700 below.

The error report 600 for error 402 includes a reproduced error with associated information 602, an associated un-minified stack 604, and an associated raw stack 606. The associated information 602 may include a name of the production code, total error instances, country affected, and a session ID. The un-minified stack 604 may display a stack trace with references to an associated source code. For example, the un-minified stack may be normalized to display similar information in a similar format from different browsers or other suitable sources of stack traces. The raw stack 606 may display a stack trace as it is received from a browser or other source.

The diagram of FIG. 6 is not intended to indicate that the example operating error report 600 is to include all of the components shown in FIG. 6. Rather, the example operating error report 600 can include fewer or additional components not illustrated in FIG. 6 (e.g., additional steps, information, etc.).

FIG. 7 is intended to provide a brief, general description of an example operating environment in which the various techniques described herein may be implemented. For example, a method and system for debugging transformed code can be implemented in such an operating environment. While the claimed subject matter has been described above in the general context of computer-executable instructions of a computer program that runs on a local computer or remote computer, the claimed subject matter also may be implemented in combination with other program modules. Generally, program modules include routines, programs, components, data structures, or the like that perform particular tasks or implement particular abstract data types. The example operating environment 700 includes a computer 702. The computer 702 includes a processing unit 704, a system memory 706, and a system bus 708.

The system bus 708 couples system components including, but not limited to, the system memory 706 to the processing unit 704. The processing unit 704 can be any of various available processors. Dual microprocessors and other multiprocessor architectures also can be employed as the processing unit 704.

The system bus 708 can be any of several types of bus structure, including the memory bus or memory controller, a peripheral bus or external bus, and a local bus using any variety of available bus architectures known to those of ordinary skill in the art. The system memory 706 includes computer-readable storage media that includes volatile memory 710 and nonvolatile memory 712.

The basic input/output system (BIOS), containing the basic routines to transfer information between elements within the computer 702, such as during start-up, is stored in nonvolatile memory 712. By way of illustration, and not limitation, nonvolatile memory 712 can include read-only memory (ROM), programmable ROM (PROM), electrically programmable ROM (EPROM), electrically erasable programmable ROM (EEPROM), or flash memory.

Volatile memory 710 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), SynchLink™ DRAM (SLDRAM), Rambus® direct RAM (RDRAM), direct Rambus® dynamic RAM (DRDRAM), and Rambus® dynamic RAM (RDRAM).

The computer 702 also includes other computer-readable media, such as removable/non-removable, volatile/nonvolatile computer storage media. FIG. 7 shows, for example a disk storage 714. Disk storage 714 includes, but is not limited to, devices like a magnetic disk drive, floppy disk drive, tape drive, Jaz drive, Zip drive, LS-210 drive, flash memory card, memory stick, flash drive, and thumb drive.

In addition, disk storage 714 can include storage media separately or in combination with other storage media including, but not limited to, an optical disk drive such as a compact disk, ROM device (CD-ROM), CD recordable drive (CD-R Drive), CD rewritable drive (CD-RW Drive), a digital versatile disk (DVD) drive. To facilitate connection of the disk storage devices 714 to the system bus 708, a removable or non-removable interface is typically used such as interface 716.

It is to be appreciated that FIG. 7 describes software that acts as an intermediary between users and the basic computer resources described in the suitable operating environment 700. Such software includes an operating system 718. The operating system 718, which can be stored on disk storage 714, acts to control and allocate resources of the computer 702.

System applications 720 take advantage of the management of resources by operating system 718 through program modules 722 and program data 724 stored either in system memory 706 or on disk storage 714. It is to be appreciated that the claimed subject matter can be implemented with various operating systems or combinations of operating systems.

A user enters commands or information into the computer 702 through input devices 726. Input devices 726 include, but are not limited to, a pointing device, such as, a mouse, trackball, stylus, and the like, a keyboard, a microphone, a joystick, a satellite dish, a scanner, a TV tuner card, a digital camera, a digital video camera, a web camera, and the like. The input devices 726 connect to the processing unit 704 through the system bus 708 via interface ports 728. Interface ports 728 include, for example, a serial port, a parallel port, a game port, and a universal serial bus (USB).

Output devices 730 use some of the same type of ports as input devices 726. Thus, for example, a USB port may be used to provide input to the computer 702, and to output information from computer 702 to an output device 730.

Output adapter 732 is provided to illustrate that there are some output devices 730 like monitors, speakers, and printers, among other output devices 730, which are accessible via adapters. The output adapters 732 include, by way of illustration and not limitation, video and sound cards that provide a means of connection between the output device 730 and the system bus 708. It can be noted that other devices and systems of devices can provide both input and output capabilities such as remote computers 734.

The computer 702 can be a server hosting various software applications in a networked environment using logical connections to one or more remote computers, such as remote computers 734. The remote computers 734 may be client systems configured with web browsers, PC applications, mobile phone applications, and the like.

The remote computers 734 can be a personal computer, a server, a router, a network PC, a workstation, a microprocessor based appliance, a mobile phone, a peer device or other common network node and the like, and typically includes many or all of the elements described relative to the computer 702. Remote computers 734 can be logically connected to the computer 702 through a network interface 736 and then connected via a communication connection 738, which may be wireless.

Network interface 736 encompasses wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection 738 refers to the hardware/software employed to connect the network interface 736 to the bus 708. While communication connection 738 is shown for illustrative clarity inside computer 702, it can also be external to the computer 702. The hardware/software for connection to the network interface 736 may include, for exemplary purposes, internal and external technologies such as, mobile phone switches, modems including regular telephone grade modems, cable modems and DSL modems, ISDN adapters, and Ethernet cards.

An example processing unit 704 for the server may be a computing cluster. The disk storage 714 may include an enterprise data storage system, for example, holding thousands of impressions.

The user may store the code samples to disk storage 714. The disk storage 714 can include a number of modules 722 configured to implement automated assignment of errors in transformed code, including a receiver module 740, a correlator module 742, a detransformation module 744, a query module 746, and an assignor module 748. The receiver module 740, correlator module 742, detransformation module 744, query module 746, and assignor module 748 refer to structural elements that perform associated functions. In some embodiments, the functionalities of the receiver module 740, correlator module 742, detransformation module 744, query module 746, and the assignor module 748 can be implemented with logic, wherein the logic, as referred to herein, can include any suitable hardware (e.g., a processor, among others), software (e.g., an application, among others), firmware, or any combination of hardware, software, and firmware. For example, the receiver module 740 can be configured to receive an error corresponding to the transformed code from a production service. For example, the receiver module 740 may receive the error from a telemeter coupled to the production service.

Further, the disk storage 714 can include a correlator module 742 configured to correlate the error to a symbol generated for the transformed code. For example, the symbol may include metadata including the location of the repository. In some examples, the symbol may have been generated during a transformation of the source code into the transformed code. In some examples, the correlator module 742 can be configured to normalize the error and join a first line of the normalized error with the metadata. In some examples, the detransformation module 744 may include code to unminify the transformed code or disassemble the transformed code based on the symbol. For example, the symbol may be a source map. The disk storage 714 can include a query module 746 configured to query a repository storing a source code corresponding to the transformed code using the symbol. The disk storage 714 can also include an assignor module 748 configured to assign the error to a developer based on a version history of the source code in the repository. In some examples, the assignor module 748 can aggregate a plurality of errors and deduplicate the errors based on the source code. For example, the assignor module 748 can identify a set of unduplicated errors that excludes duplicate errors based on the source code. In some examples, the assignor module 748 can assign the error to a developer based on a number of times the developer modified a line of the code associated with the error. In some examples, the assignor module 748 can assign the error to a developer based on a last modification to the line of code associated with the error. In some examples, the assignor module 748 can assign the error to a developer based on a threshold number of error instances being exceeded.

In some examples, some or all of the processes performed for publishing content can be performed in a cloud service and reloaded on the client computer of the user. For example, some or all of the applications described above for publishing content could be running in a cloud service and receiving input from a user through a client computer.

Figure 8:
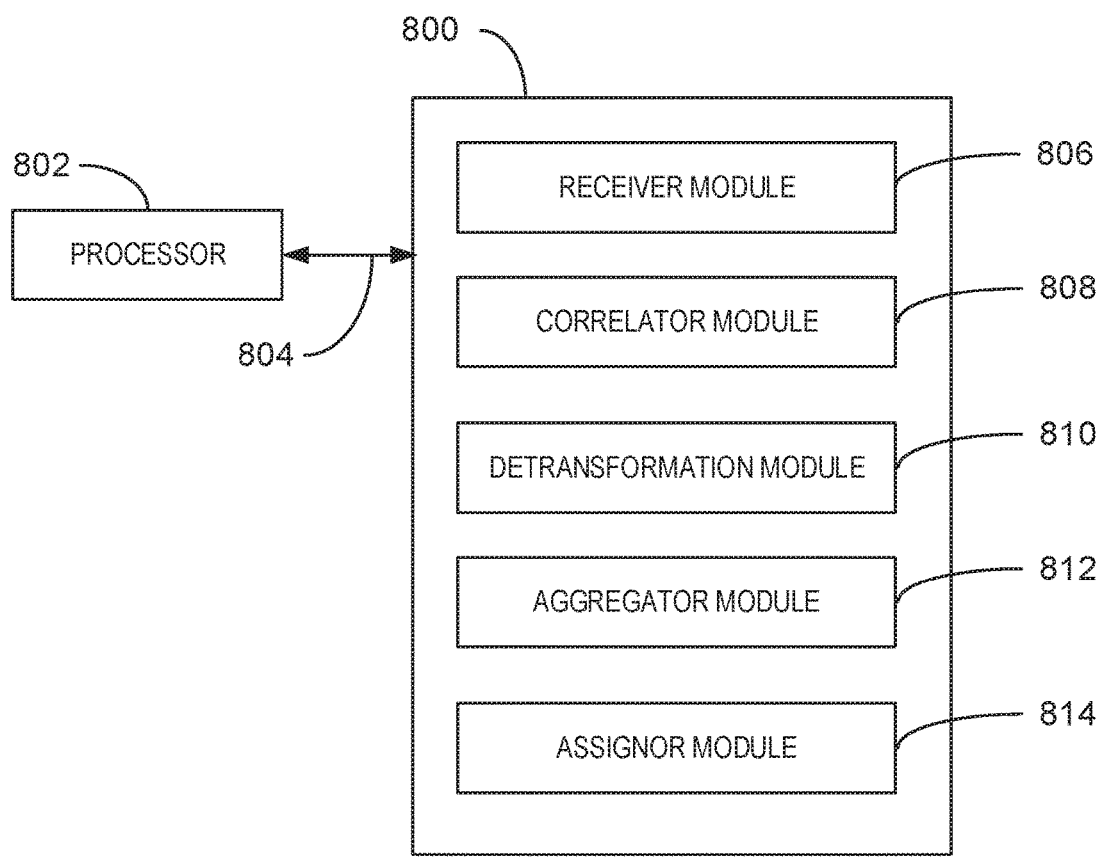
FIG. 8 is a block diagram showing example computer-readable storage media that can store instructions for automated assignment of errors.

FIG. 8 is a block diagram showing computer-readable storage media 800 that can store instructions for automated assignment of errors. The computer-readable storage media 800 may be accessed by a processor 802 over a computer bus 804. Furthermore, the computer-readable storage media 800 may include code to direct the processor 802 to perform steps of the techniques disclosed herein.

The computer-readable storage media 800 can include code such as a receiver module 806 configured to receive errors corresponding to a transformed code from a production service. In some examples, the module 806 can be configured to receive errors from a telemeter coupled to the production service. A correlator module 808 can be configured to correlate the errors to a symbol generated during a build of the transformed code. The symbol includes metadata including transformation data. Transformation data may include a mapping between two states of a transformation, such as a minification, concatenation, etc.

Further, the computer-readable storage media 800 can include a detransformation module 810 configured to reverse the transformed code to a source code based on transformation data in the metadata and locate the errors in the source code. For example, the detransformation module 810 configured to unminify, disassemble, or otherwise transform a transformed code back into a source code.

The computer-readable storage media 800 can also include an aggregator module 812 configured to aggregate the errors to identify a set of unduplicated errors that excludes duplicate errors based on the source code. For example, the aggregator module 812 can calculate the number of errors associated with the source code. An assignor module 814 can then assign each of the unduplicated errors to a developer based on a version history of the source code in a repository storing the source code. In some examples, the assignor module 814 can include instructions to assign each error based on a last modification of source code associated with each error. In some examples, the assignor module 814 can include instructions to assign the error based on a number of modifications by the developer of source code associated with the error. In some examples, the assignor module 814 can include instructions to prioritize the errors based on total instances of each error. In some examples, the assignor module 814 can include instructions to generate a link to the source code and the repository storing the source code.

It is to be understood that any number of additional software components not shown in FIG. 8 may be included within the computer-readable storage media 800, depending on the specific application. Although the subject matter has been described in language specific to structural features and/or methods, it is to be understood that the subject matter defined in the appended claims is not necessarily limited to the specific structural features or methods described above. Rather, the specific structural features and methods described above are disclosed as example forms of implementing the claims.

Example 1

This example provides for an example system for debugging transformed code. The example system includes a computer processor and a computer-readable memory storage device storing executable instructions that can be executed by the processor to cause the processor to receive an error corresponding to a transformed code from a production service. The executable instructions can be executed by the processor to correlate the error to a symbol generated for the transformed code. The executable instructions can be executed by the processor to query a repository storing a source code corresponding to the transformed code using the symbol. The executable instructions can be executed by the processor to assign the error to a developer based on a version history of the source code in the repository. Alternatively, or in addition, the symbol is a source map including metadata updated during a code transformation. Alternatively, or in addition, the executable instructions can be executed by the processor to normalize the error and join the first line of the normalized error with the metadata. Alternatively, or in addition, the executable instructions can be executed by the processor to unminify the transformed code or disassemble the transformed code based on the symbol, wherein the symbol includes a source map. Alternatively, or in addition, the executable instructions can be executed by the processor to aggregate a plurality of errors and deduplicate the errors based on the source code. Alternatively, or in addition, the executable instructions can be executed by the processor to assign the error to a developer based on a number of times the developer modified a line of the code associated with the error. Alternatively, or in addition, the executable instructions can be executed by the processor to assign the error to a developer based on a last modification to the line of code associated with the error. Alternatively, or in addition, the executable instructions can be executed by the processor to assign the error to a developer based on a threshold number of error instances being exceeded.

Example 2

This example provides for an method for debugging transformed code. The example method includes receiving an error corresponding to the transformed code. The method also includes correlating the error to a symbol generated for the transformed code. The method further includes querying a repository storing a source code corresponding to the transformed code using the symbol, wherein the symbol includes metadata including a location of the repository. The method further also includes assigning the error to a developer based on a version history of the source code in the repository. Alternatively, or in addition, correlating the error further includes normalizing the error and joining a first line of the normalized error with the metadata. Alternatively, or in addition, correlating the error further includes unminifying the transformed code or disassembling the transformed code based on the symbol. Alternatively, or in addition, the method can also include aggregating a plurality of errors and deduplicating the errors based on the source code. Alternatively, or in addition, assigning the error to the developer further includes determining the developer is a lead developer based on a higher number modifications to a source code associated with the error and assigning the error to the lead developer. Alternatively, or in addition, assigning the error to the developer further includes determining the developer is a last developer to modify a line of code associated with the error and assigning the error to the last developer. Alternatively, or in addition, assigning the error to the developer further includes triaging the error with other detected errors in the transformed code based on a number of times each error is reproduced.

Example 3

This example provides for an example computer-readable storage device for software debugging. The example computer-readable storage device includes executable instructions that can be executed by a processor to cause the processor to receive errors corresponding to a transformed code from a production service. The executable instructions can be executed by the processor to correlate the errors to a symbol generated during a build of the transformed code, wherein the symbol includes metadata including transformation data. The executable instructions can be executed by the processor to reverse the transformed code to a source code based on transformation data in the metadata and locate the errors in the source code. The executable instructions can be executed by the processor to aggregate the errors to identify a set of unduplicated errors that excludes duplicate errors based on the source code. In addition, the executable instructions can be executed by the processor to assign each of the unduplicated errors to a developer based on a version history of the source code in a repository storing the source code. Alternatively, or in addition, the executable instructions can be executed by the processor to assign each error based on a last modification of source code associated with each error. Alternatively, or in addition, the executable instructions can be executed by the processor to assign the error based on a number of modifications by the developer of source code associated with the error. Alternatively, or in addition, the executable instructions can be executed by the processor to prioritize the errors based on total instances of each error. Alternatively, or in addition, the executable instructions can be executed by the processor to generate a link to the source code and the repository storing the source code.

Example 4

This example provides for an example system for debugging transformed code. The example system includes means for receiving an error corresponding to a transformed code from a production service. The system includes means for correlating the error to a symbol generated for the transformed code. The system includes means for querying a repository storing a source code corresponding to the transformed code using the symbol. The system includes means for assigning the error to a developer based on a version history of the source code in the repository. Alternatively, or in addition, the symbol can be a source map including metadata updated during a code transformation. Alternatively, or in addition, the system can include means for normalizing the error and join the first line of the normalized error with the metadata. Alternatively, or in addition, the system can include means for unminifying the transformed code or disassemble the transformed code based on the symbol, wherein the symbol includes a source map. Alternatively, or in addition, the system can include means for aggregating a plurality of errors and deduplicate the errors based on the source code. Alternatively, or in addition, the system can include means for assigning the error to a developer based on a number of times the developer modified a line of the code associated with the error. Alternatively, or in addition, the system can include means for assigning the error to a developer based on a last modification to the line of code associated with the error. Alternatively, or in addition, the system can include means for assigning the error to a developer based on a threshold number of error instances being exceeded.

What has been described above includes examples of the disclosed subject matter. It is, of course, not possible to describe every conceivable combination of components or methodologies for purposes of describing the disclosed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component, e.g., a functional equivalent, even though not structurally equivalent to the disclosed structure, which performs the function in the herein illustrated exemplary aspects of the disclosed subject matter. In this regard, it will also be recognized that the innovation includes a system as well as a computer-readable storage media having computer-executable instructions for performing the acts and events of the various methods of the disclosed subject matter.

There are multiple ways of implementing the disclosed subject matter, e.g., an appropriate API, tool kit, driver code, operating system, control, standalone or downloadable software object, etc., which enables applications and services to use the techniques described herein. The disclosed subject matter contemplates the use from the standpoint of an API (or other software object), as well as from a software or hardware object that operates according to the techniques set forth herein. Thus, various implementations of the disclosed subject matter described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and additional components, and according to various permutations and combinations of the foregoing. Sub-components can also be implemented as components communicatively coupled to other components rather than included within parent components (hierarchical).

Additionally, it can be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the disclosed subject matter may have been disclosed with respect to one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A system for debugging transformed code, comprising:
a computer processor; and
a computer memory, comprising instructions that cause the computer processor to:
receive an error comprising a stack trace corresponding to a transformed code from a production service;
correlate the error to a symbol that includes a source map and metadata generated for the transformed code, wherein the computer processor is to unminify the transformed code based on the source map to generate a line number for the error in a source code associated with the transformed code and to aggregate the error with other received errors using a filename and the line number of the error in the source code;
query a repository storing the source code corresponding to the transformed code using an address in the metadata; and
assign the error to a developer based on a version history of the source code in the repository, the assigned error including the line number in the source code.

2. The system of claim 1, the computer memory comprising instructions that cause the computer processor to normalize the error and join the first line of the normalized error with the metadata.

3. The system of claim 1, the computer memory comprising instructions that cause the computer processor to deduplicate the error and the other received errors based on the source code.

4. The system of claim 1, the computer memory comprising instructions that cause the computer processor to assign the error to a developer based on a number of times the developer modified a line of the code associated with the error.

5. The system of claim 1, the computer memory comprising instructions that cause the computer processor to assign the error to a developer based on a last modification to the line of code associated with the error.

6. The system of claim 1, the computer memory comprising instructions that cause the computer processor to assign the error to a developer based on a threshold number of error instances being exceeded.

7. A method for debugging transformed code, the method implemented with a computer system having one or more processors and memory-stored instructions thereon, which when executed by one such processors, perform the method, comprising:
receiving, via a processor, an error comprising a stack trace corresponding to a transformed code from a production service;
correlating, via the processor, the error to a symbol that includes a source map and metadata generated for the transformed code, wherein correlating the error comprises normalizing the error and joining a first line of the normalized error with the metadata associated with the transformed code;
querying, via the processor, a repository storing a source code corresponding to the transformed code using the symbol, wherein the symbol comprises the metadata comprising a location of the repository; and
assigning, via the processor, the error to a developer based on a version history of the source code in the repository.

8. The method of claim 7, wherein correlating the error further comprises unminifying the transformed code or disassembling the transformed code based on the symbol.

9. The method of claim 7, further comprising aggregating a plurality of errors and deduplicating the errors based on the source code.

10. The method of claim 7, wherein assigning the error to the developer further comprises determining the developer is a lead developer based on a higher number modifications to a source code associated with the error and assigning the error to the lead developer.

11. The method of claim 7, wherein assigning the error to the developer further comprises determining the developer is a last developer to modify a line of code associated with the error and assigning the error to the last developer.

12. The method of claim 7, wherein assigning the error to the developer further comprises triaging the error with other detected errors in the transformed code based on a number of times each error is reproduced.

13. A computer-readable storage device for software debugging, comprising instructions that cause a computer processor to:
receive errors corresponding to a transformed code from a production service;
correlate the errors to a symbol generated during a build of the transformed code, wherein the symbol comprises metadata comprising transformation data;
unminify the transformed code or disassemble the transformed code based on the symbol, wherein the symbol comprises a source map;
reverse the transformed code to a source code based on transformation data in the metadata and locate the errors in the source code;
aggregate the errors to identify a set of unduplicated errors that excludes duplicate errors based on the source code; and
assign each of the unduplicated errors to a developer based on a version history of the source code in a repository storing the source code.

14. The computer-readable storage device of claim 13, comprising instructions that cause the computer processor to assign each error based on a last modification of source code associated with each error.

15. The computer-readable storage device of claim 13, comprising instructions that cause the computer processor to assign the error based on a number of modifications by the developer of source code associated with the error.

16. The computer-readable storage device of claim 13, comprising instructions that cause the computer processor to prioritize the errors based on total instances of each error.

17. The computer-readable storage device of claim 13, comprising instructions that cause the computer processor to generate a link to the source code and the repository storing the source code.

* * * * *